INVENTORS
ODD WENNBERG
ALFRED E. WEGNER
CHARLES C. SPADONE
BY
ATTORNEYS

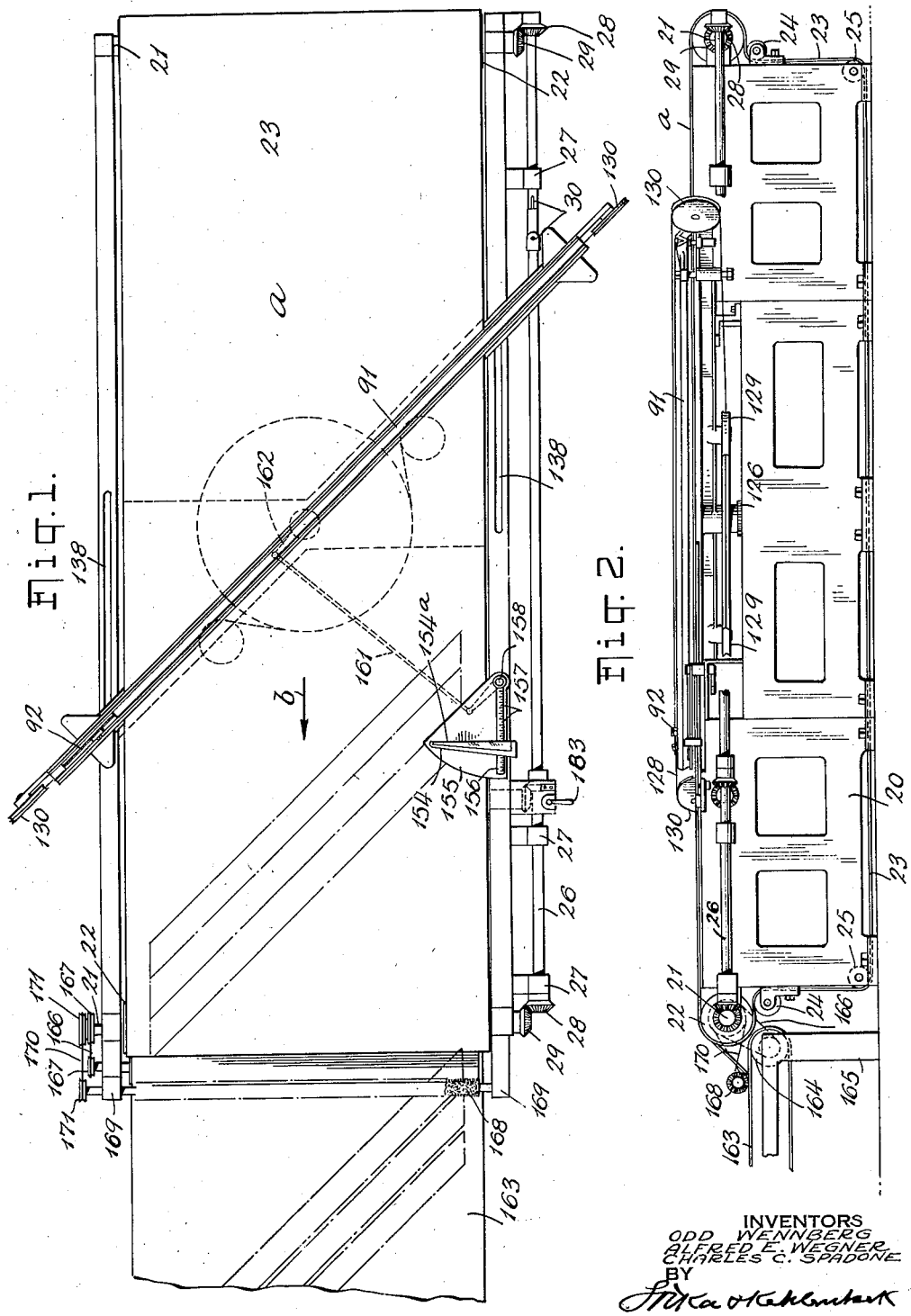

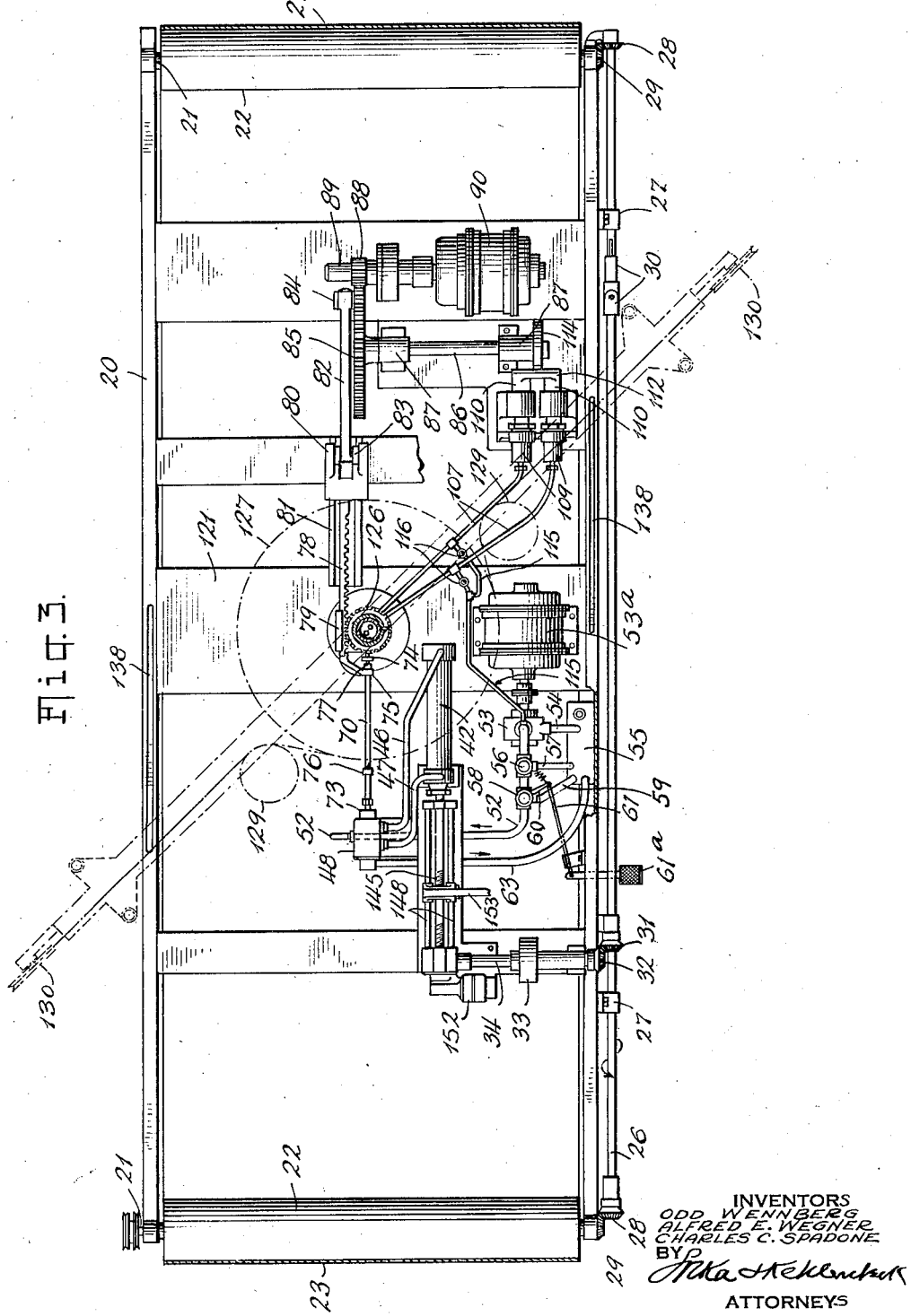

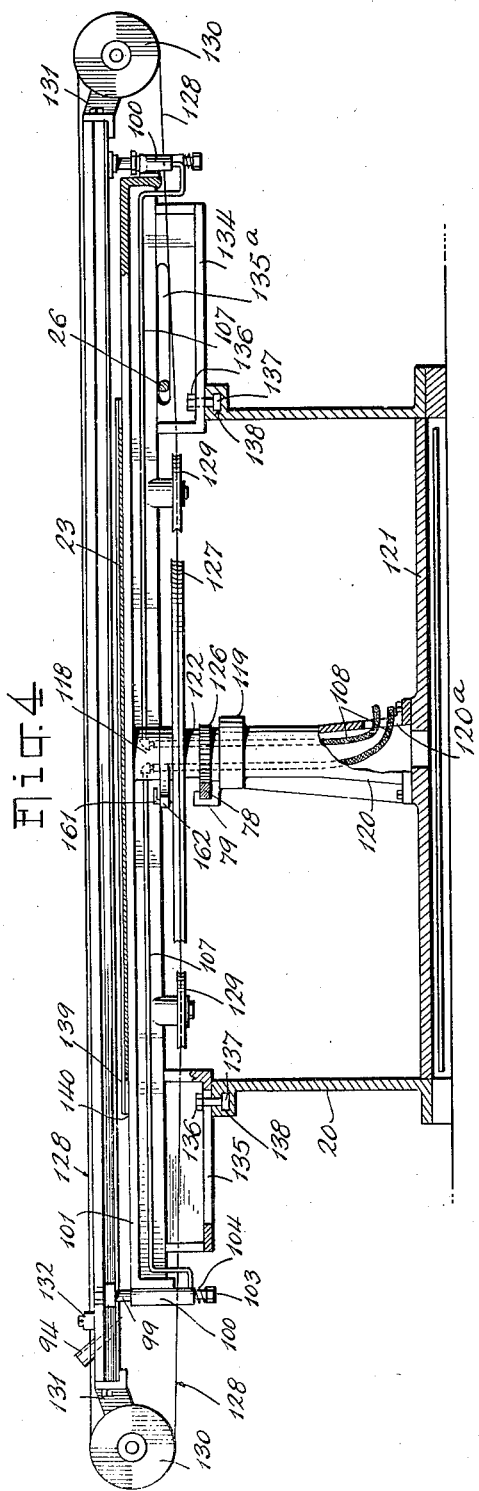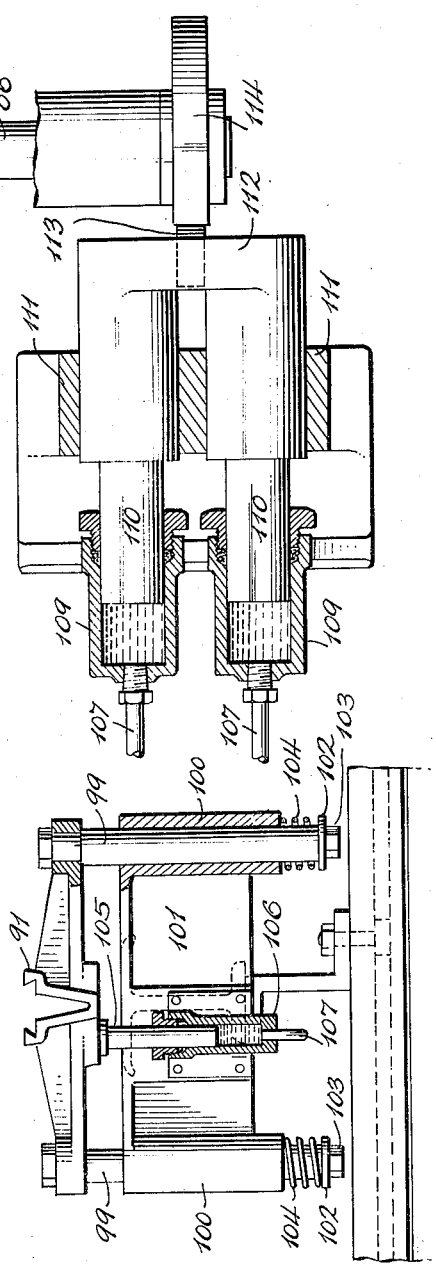

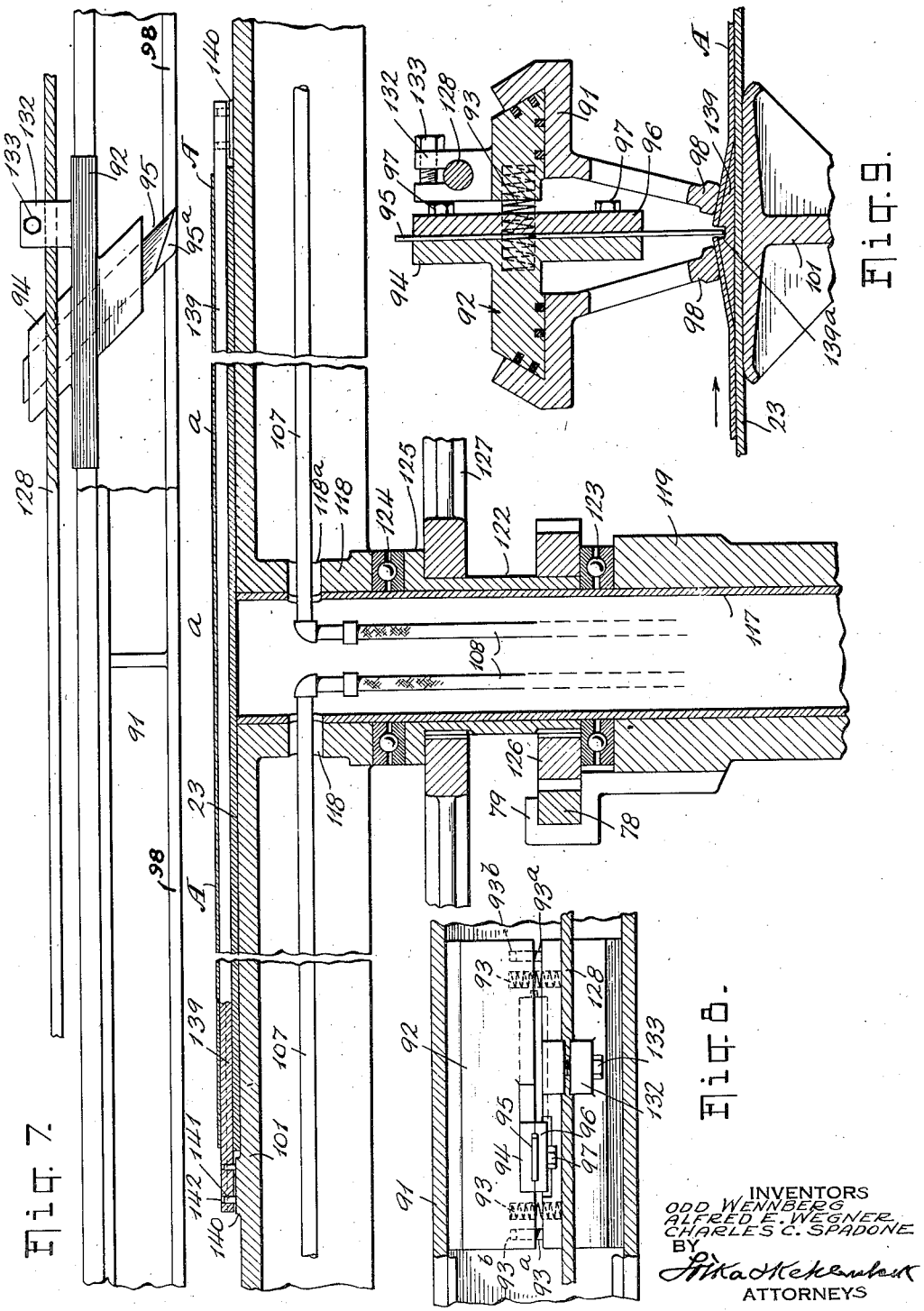

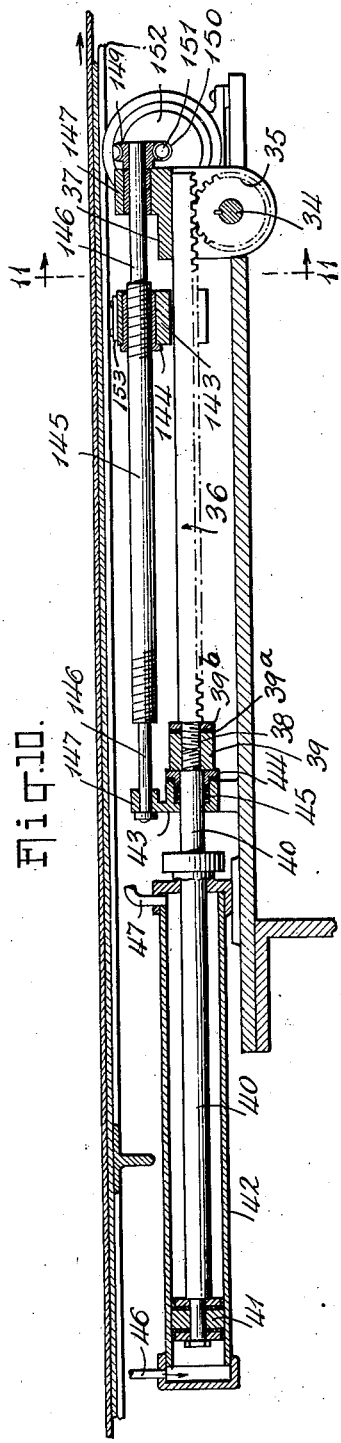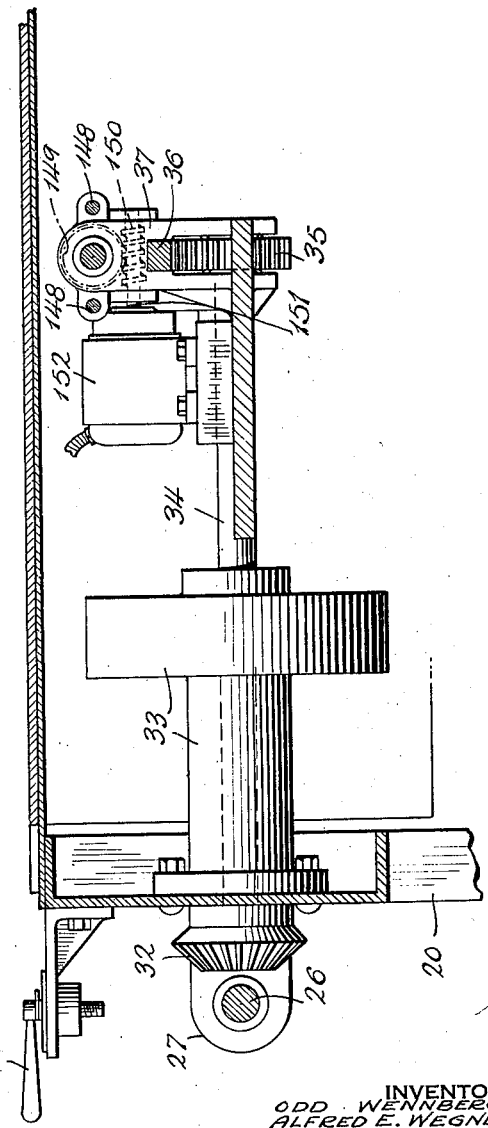

Patented Feb. 16, 1937

2,071,097

UNITED STATES PATENT OFFICE 2,071,097

CUTTING MACHINE

Odd Wennberg, Laurelton, Alfred E. Wegner, Flushing, and Charles C. Spadone, Rockville Centre, N. Y., assignors to Spadone Machine Company, Inc., New York, N. Y., a corporation of New York Application March 6, 1933, Serial No. 659,614

22 Claims. (Cl. 164—73)

Our invention relates to machines for cutting fabrics and other materials, and more particularly to machines for cutting impregnated fabrics such as are used in the manufacture of pneumatic tire casings and hose of various types. Our invention contemplates particularly the provision of a novel cutting machine of the indicated class which is extremely simple in construction and which operates with a maximum of efficiency in an accurate and reliable manner. Another object of the invention is to provide a machine whereby the cutting operations may be readily adjusted to vary the distance between successive cuts in order to provide strips of different widths at will. Other more specific objects will appear from the description hereinafter and the features of novelty will be pointed out in the claims.

Figure 12:
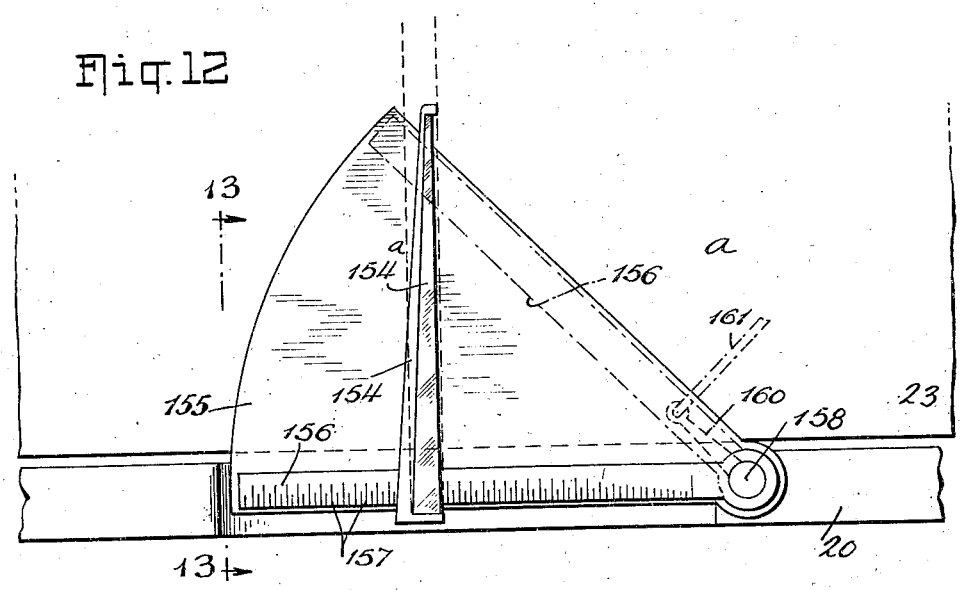
Figure 13:
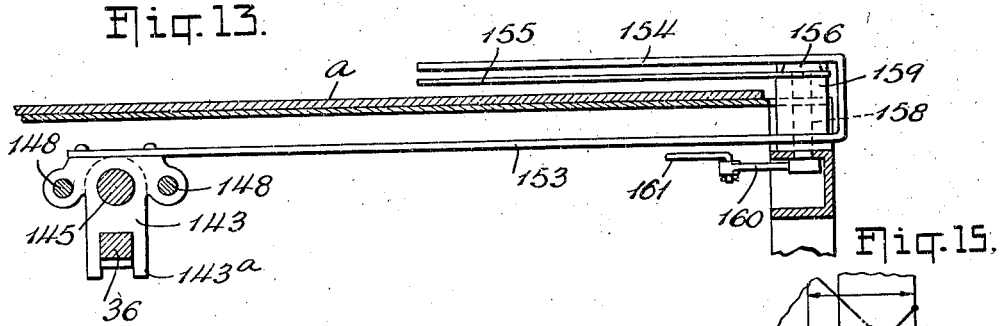
Figure 15:
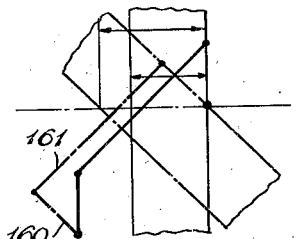
Figure 14:
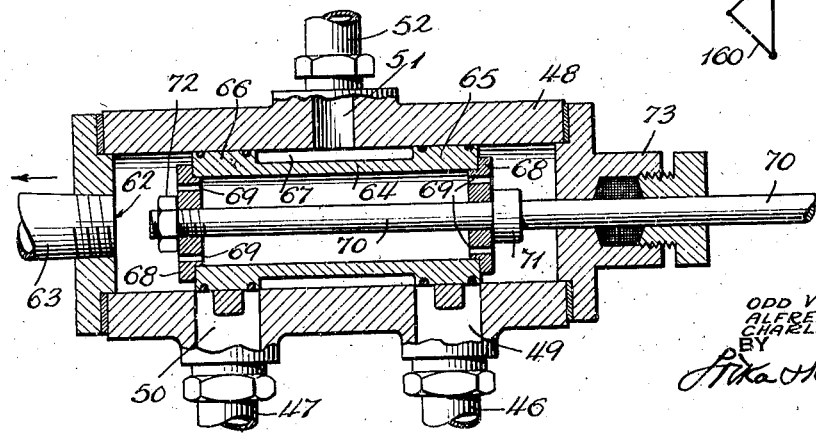

In the accompanying drawings, which illustrate an example of the invention without defining its limits, Fig. 1 is a plan view of the novel machine; Fig. 2 is a side elevation thereof; Fig. 3 is a somewhat enlarged plan view with parts in section; Fig. 4 is a transverse sectional elevation; Figs. 5 and 6 are fragmentary detail views, partly in section, showing the means for shifting the cutting mechanism to and from its cutting position; Figs. 7, 8, and 9 are detail sectional views on an enlarged scale, illustrating the cutting mechanism; Fig. 10 is a detail sectional view illustrating the means for adjusting the distance between successive cuts to selectively vary the width of the cut sections or strips of material; Fig. 11 is a fragmentary section, on an enlarged scale, on the line 11—11 of Fig. 10; Fig. 12 is a fragmentary plan view of the setting means associated with said adjusting means; Fig. 13 is a fragmentary sectional elevation on the line 13—13 of Fig. 12; Fig. 14 is an enlarged sectional view of a control valve forming part of the machine, and Fig. 15 is a diagram illustrating certain features of the adjusting means.

In its illustrated form the machine comprises a frame or support 20 of suitable form and construction on which shafts 21 carrying feed rollers 22 are journalled in predetermined spaced registry, dependent upon the length and other dimensions of the machine; at least one of said rollers 22 is preferably mounted in the machine so as to be adjustable within predetermined limits toward and away from the other roller 22 to properly adjust the endless belt 23 which passes over said rollers 22 as shown in Fig. 2. In the illustrated example the rollers 22 are located in a common horizontal plane so that the upper run a of the belt 23 is positioned and travels in a horizontal direction; as shown in the drawings the belt 23 further passes over upper idlers 24 journalled at opposite ends of the frame 20 and over additional lower idlers 25 mounted at said opposite ends at the lower portion of said frame 20 as illustrated in Fig. 2. It will be obvious that the belt 23 may be otherwise arranged than as shown, so long as the upper run a thereof travels in a horizontal direction; the rollers 22 and the co-operating belt 23 may be of transverse dimensions suitable to the type of work for which the machine is designed.

The belt 23 is operated in such a manner that the upper run a thereof is advanced in steps in a given direction for instance as indicated by the arrow b in Fig. 1; the extent of movement of the belt 23 in each step is dependent upon the width of the strips of material which are to be cut by the machine and is adjustable as will be more fully described hereinafter. In those branches of manufacture for which the instant machine is particularly designed, it is generally essential to the production of an efficient and satisfactory product to have the dimensions of the cut sections as accurate and uniform as possible, and it accordingly becomes necessary to feed the upper run a of the belt 23 in steps, which in extent are such that the successive cutting operations, to be more fully set forth hereinafter, will produce cut sections of material which are exactly of the desired size. The accurate periodical feeding of the upper run a of the belt 23 to attain the desired results is attained by means of the following novel mechanism.

In the first place the feed rollers 22 preferably are operatively connected with each other, in a suitable manner, to rotate in unison, although in some installations it may be sufficient to positively drive one of said rollers 22 and permit the other roller 22 in such case to operate as an idler. In the illustrated example the feed rollers 22 are operatively connected with each other by means of a shaft 26 journalled in bearings 27 on the frame 20 and carrying bevel-gears 28 meshing with bevel-gears 29 fixed upon the shafts 21 of the two feed rollers 22. To permit one of said rollers 22 to be shifted for the purpose of properly adjusting the tension of the belt 23 and more particularly the upper run a thereof and to compensate for slight variations in shaft alinement, the shaft 26 consists of two sections connected with each other by means of any conventional type of universal joint and splined coupling 30 as shown in Figs. 1 and 3.

The shaft 26 is operatively connected with the operating mechanism in a convenient manner to effect a step-by-step rotation thereof, and in the illustrated example, is accordingly provided at a suitable intermediate point with a bevel-pinion 31 (see Fig. 3) secured on said shaft 26 to rotate therewith. The bevel-pinion 31 meshes with a cooperating bevel-pinion 32 in fixed connection with a ratchet unit 33 of any conventional type adapted to impart a step-by-step movement in a given direction to the bevel-pinion 32; the ratchet unit 33 is further operatively connected with a countershaft 34 journalled in suitable bearings on the frame 20 as shown, for instance, in Figs. 10 and 11. A pinion 35 is secured upon the countershaft 34 and meshes with a toothed-rack 36 slidable in a guide-bearing 37 conveniently mounted in the machine, said rack 36 being provided at one end with a threaded boss 38 for connection with an internally threaded collar 39 as illustrated in Fig. 10; the collar 39 in turn is in screwthreaded connection with a piston rod 40 which accordingly constitutes a continuation of said rack 36 as clearly shown in Fig. 10. The piston rod 40 carries a piston 41 mounted for reciprocation in a cylinder 42 supported in operative position on a suitable portion of the frame 20. The piston rod 40 is guided in its reciprocatory movements in a bracket-bearing 43 fastened to the frame 20 in axial registry with the cylinder 42, said bracket-bearing 43, in addition to its other functions, serving as a stop to arrest the movement of the rack 36, piston rod 40 and piston 41 in one direction. In the preferred arrangement the bracket-bearing 43 includes a shock absorber consisting, for instance, of an impact receiving member 44 and a cushioning spring 45 located in a recess formed in said bracket-bearing 43 as shown in Fig. 10, said shock absorber serving to neutralize and absorb the impact of the collar 39 as it engages the impact receiving member 44; the movement of the parts toward the left in Fig. 10 is thus yieldingly arrested without injury to and disarrangement of the mechanism.

As illustrated in Fig. 3 the opposite ends of the cylinder 42 are connected by pipes 46 and 47 with a four-way operating valve 48 mounted at a suitable point in the machine in any convenient manner; as shown in Fig. 14 the four-way valve 48 is provided with ports 49 and 50 communicating respectively with the pipes 46 and 47. The operating valve 48 further includes an inlet port 51 which communicates with an inlet pipe 52 leading to the output side of a pump 53 suitably supported on the frame 20, and operatively connected, for instance, with an electric motor 53ª conveniently mounted on the frame 20; the intake side of said pump 53 is connected by means of a pipe 54 with a supply of oil or other substantially non-compressible fluid, which supply, in the illustrated example, is contained in a tank or equivalent receptacle 55 mounted on the frame 20. For the purpose to be more fully set forth hereinafter the pipe 52 may be provided with a relief valve 56 of conventional type connected by means of a branch pipe 57 with the tank 55 as shown in Fig. 3. In addition the pipe 52 preferably includes a three-way by-pass valve 58 of any suitable existing form and connected with said tank 55 by means of a branch pipe 59, said by-pass valve 58 having an operating arm 60 which may be manually controlled in any convenient manner; to facilitate such control the operating arm 60 may be connected by suitable linkage connections 61 with a lever 61ª.

The four-way operating valve 48, in addition to the ports so far mentioned, includes an outlet port 62 communicating with an outlet pipe 63 leading to the previously mentioned tank 55 as illustrated in Fig. 3. A tubular valve plunger 64 is slidably mounted in the casing of the operating valve 48 and is provided with annular spaced lands 65 and 66 and an intermediate reduced portion whereby an annular space 67 is formed interiorly of the valve casing as shown in Fig. 14; the opposite ends of the plunger 64 are closed by means of end plates 68 having apertures 69 extending therethrough for the purpose to be more fully set forth hereinafter. An actuating rod 70 extends through the end plates 68 which are clamped in place on the opposite ends of the plunger 64 by means of an annular boss 71 on the rod 70 and a nut 72 screwed upon the threaded end thereof; the plunger 64 is thus fixed upon the actuating rod 70 to move therewith.

The rod 70 extends slidably through a customary stuffing-box 73 at one end of the casing of the valve 48 and further is slidably mounted in a bearing 74 fixed on the frame 20, so that said rod 70 is reciprocable in the direction of its length to correspondingly move the valve plunger 64 as will appear more fully hereinafter. For the purpose of operating the valve plunger 64 in properly timed relation with the other mechanisms, an operating member 75 is slidable lengthwise of said rod 70 between stop collars 76 and 77 which are secured on said rod 70 in any conventional manner preferably so as to be adjustable thereon. In the illustrated example the operating member 75 is carried by and movable with a reciprocating rack 78 slidably mounted on a guide bracket 79, which rack 78, in addition to actuating the operating member 75, also constitutes a part of the cutting mechanism as will be more fully described hereinafter. The rack 78 projects from and is movable with a cross-head 80 slidably mounted on a guideway 81 suitably secured on the frame 20; one end of a connecting rod 82 is pivotally connected at 83 with said cross-head 80 and has its other end pivotally connected at 84 with a crank member which is illustrated in the form of a gear 85 as shown in Fig. 3. The gear 85 is mounted upon a shaft 86 journalled in bearings 87 on the frame 20, and meshes with a pinion 88 carried by the shaft 89 of an electric motor 90 supported at the proper place on the frame 20 for instance as shown in Fig. 3.

In addition to the parts so far described the machine includes cutting mechanism which in the illustrated example consists of a raceway 91 extending transversely across the upper run a of the belt 23 and slidably accommodating a carriage 92 which preferably is of the self-oiling type as illustrated in Fig. 9. The carriage 92 is constructed of two sections which are yieldingly forced apart by springs 93 so as to be maintained in the most efficient sliding contact with the sidewalls of the raceway 91 and without variation in a constant path of reciprocation to thereby insure absolutely straight and accurate cuts; to maintain the carriage sections in proper relation to each other without interference with the action of the springs 93, one of said sections may be provided with pins 93ª which extend into cooperating recesses 93ᵇ formed in the other carriage section as shown in Fig. 8. The carriage 92 is further provided with a preferably inclined holder 94 in which the knife 95 is clamped by means of a clamping member 96 and bolts 97 so as to project downwardly below said carriage 92 at an inclination as shown in Fig. 7; the lower end of the knife 95 is formed with a cutting edge 95ª which tapers downwardly and also in the cutting direction so that in addition to its cutting action, said cutting edge 95ª will act as a wedge to force the cut fabric or other material apart as the cutting operation proceeds to thereby facilitate the cutting of said fabric or other material. To maintain the fabric or other material against movement during the actual cutting operations, the raceway 91 is provided with depending pressure members 98 as shown in Fig. 9.

In order to enable the knife 95 to be shifted into proper cutting position to make the desired cuts and to an inoperative position out of said cutting position during the movements of recovery and while the fabric or other material is being advanced by the feeding mechanism, the raceway 91 is vertically movable and is carried by guide rods 99 vertically slidable in tubular bearings 100 carried by and located at opposite ends of a supporting bar 101 as shown in Fig. 5. The rods 99 project downwardly through said bearings 100 and at their lower ends are provided with washers 102 held in place by nuts 103 and forming abutments for compression springs 104 which also engage the lower ends of said tubular bearings 100 as illustrated in Fig. 5; the springs 104 by acting on the washers 102 and reacting against the bearings 100 serve to return the raceway 91 to its lowered position so that the knife 95 is normally in its operative, cutting position.

The raising of the raceway 91 to shift the knife 95 to its inoperative position during movements of recovery and while the fabric or other material is being advanced, is accomplished by means of plungers 105 which depend from the raceway 91 into hydraulic cylinders 106 secured at the proper places upon the supporting bar 101 as shown in Fig. 5. The instant machine includes two plungers 105 and two cylinders 106 located at opposite ends of the supporting bar 101 and connected by means of pipes 107 and flexible tubing or hose 108 with co-operating hydraulic cylinders 109 suitably mounted on the frame 20 of the machine, for instance in operative proximity to the shaft 86 as illustrated in Fig. 3. The co-operating cylinders 109 accommodate plungers 110 slidably mounted in a stationary bearing bracket 111 on the frame 20 and connected by means of a cross-member 112 to move in unison; a roller bearing 113 is journalled on the cross-member 112 for rolling engagement with a cam 114 mounted on the shaft 86 for operating said plungers 110. The cylinders 106, pipes 107, tubing 108 and co-operating cylinders 109 are filled with oil or other substantially non-compressible liquid; to replenish the supply of such liquid when required the pipes 107 may be connected by means of branch pipes 115 which lead to the output side of the pump 53 as shown in Fig. 3, suitable valves 116 being provided in the pipes 115 for controlling the same, and for preventing the oil or its equivalent from being forced back into the pipes 115 which during the lifting action of the plungers 105 is under constant pressure, while pressure in pipes 107 exceeds such constant pressure.

In addition to being adjustable up and down as set forth above, the raceway 91 is adjustable in a horizontal plane to different angular positions with respect to the upper run a of the belt 23 in order to effect bias cuts of different degrees of angularity or to produce cuts which extend at right angles to the direction of travel of the fabric or other material. To make such adjustments possible, the supporting bar 101 is carried by a tubular sleeve 117 which has its upper end suitably secured in a boss 118 depending from said bar 101 as shown in Fig. 7; the sleeve 117 projects downwardly into and is rotatably fitted within the upper end portion 119 of an upright hollow pedestal 120 mounted upon a cross-bar 121 secured to the frame 20 at a distance above the floor or other surface on which the machine stands as illustrated in Fig. 4. At a point above the upper end portion 119 of the pedestal 120, the sleeve 117 has rotatably mounted thereon a thrust collar 122 which rests upon a ball bearing 123 supported upon the upper end of the pedestal 120; a second ball bearing 124 is located between an annular flange 125 provided at the upper end of the thrust collar 122 and the lower end of the boss 118 as illustrated in Fig. 7. The thrust collar 122 carries a gear wheel 126 which meshes with the previously described rack 78, and is further provided with a cable-wheel 127 fixed in place to rotate with said thrust collar 122 and constituting part of the mechanism for reciprocating the carriage 92 and knife 95 in the raceway 91. An endless cable 128 is wound about said cable-wheel 127 any predetermined number of times or otherwise combined with said cable wheel to effect the desired connection therewith, and passes over horizontal idlers 129 journalled on the supporting bar 101 and over vertical idlers 130 rotatably mounted in brackets 131 at opposite ends of the bar 101 to the carriage 92; the latter is provided with a clamping lug 132 controlled by a clamping bolt 133 whereby the cable 128 is connected with the carriage 92 for reciprocating the same in the raceway 91.

To maintain the raceway 91 in an adjusted position against unintentional movement, and to steady the operation of the cutting knife 95, the supporting bar 101 is mounted upon a carrier 134 which rests upon the supporting frame 20 and is movable with the bar 101 relatively to said supporting frame 20 as shown in Fig. 4; the carrier 134 is provided with slots 135 for the accommodation of bolts 136 which are threaded into clamping blocks 137 located in undercut grooves 138 formed in the frame 20 at the upper edges thereof as illustrated in Figs. 1 and 4. As shown in Fig. 4 the carrier 134 is further provided with a slot 135ª through which the shaft 26 extends; the slot 135ª is of sufficient length to permit the settings of the raceway 91 to be made throughout its range of adjustment without interference with or by said shaft 26. To further prevent interference with the adjustments of the raceway 91 and associated elements in a horizontal plane about the axis of the pedestal 120 as a centre, the pipes 107 are positioned on the supporting bar 101 in radial relation to said pedestal 120 and extend through suitable openings 118ª in the boss 118 of said supporting bar 101 and downwardly in the interior thereof; the flexible tubings or hose 108 lead downwardly from said pipes 107 interiorly of the pedestal 120 and out of the same through an opening 120ª therein into connection with the continuing pipes 107 which communicate with the cylinders 109. This arrangement of flexible hose or tubing 108 within the pedestal 120ª provides the flexibility necessary to effect the aforesaid adjustments of the raceway 91 and associated elements without interference or injury to the connections.

To permit the cutting of the fabric or other material to proceed without injury to the belt 23, a cutting bar 139 is removably mounted on lugs 140 of the supporting bar 101 for instance by means of pins 141 projecting upwardly from said lugs 140 into openings 142 in the cutting bar 139 as shown in Fig. 7; the cutting bar 139 is thus spaced above the supporting bar 101 a distance sufficient to permit the upper run a of the belt 23 to pass beneath said cutting bar 139 as illustrated in Figs. 7 and 9. The cutting bar 139 is further provided with a central cutting groove 139a extending lengthwise of said bar in registry with the cutting edge 95a of the knife 95, and has its upper surface preferably sloping downwardly in opposite directions from said groove 139a as shown in Fig. 9; with the described arrangement the cutting bar 139 automatically follows the adjustment of the raceway 91 and its associated elements and in all positions thereof protects the upper run a of the belt 23 against injury during the cutting operation. In order to clamp the fabric or other material against undesired movement during such cutting operation the lower ends of the pressure members 98 are preferably made parallel to the sloping upper surface of said cutting bar 139.

The machine in its preferred form includes means whereby the mechanism may be easily and efficiently adjusted to vary the distance between successive cuts at will to thereby produce cut sections of fabric or other material of different widths; in the illustrated example this result is attained by varying the extent of the feeding steps of the upper run a of the belt 23.

In the form shown in the drawings the machine accordingly is provided with an adjustable stop 143 projecting into the path of the collar 39 as shown in Fig. 10; to neutralize the impact of the collar 39 with the stop 143 a pad 39a of rubber or other resilient material and a metallic washer 39b are provided on the impact face of said collar 39 as illustrated in Fig. 10. The stop 143 may be adjusted to different positions for the purpose of selectively varying the distance between successive cuts, to thereby vary the width of the cut sections, by means of any suitable mechanism either manually controlled or otherwise arranged, it being understood that in any given position to which adjustment is made, said stop 143 is fixed and immovable until again intentionally shifted to a different setting; in the illustrated example said stop 143 is shifted by means of electrically operated means. As shown in the drawings, the stop 143 accordingly is mounted by means of an internally threaded bushing 144 upon a screw-threaded adjusting rod 145 having trunnions 146 journalled in bearings 147 which, as shown in Fig. 10, may comprise integral parts of the guide-bearing 37 and bracket-bearing 43 respectively; to hold the stop 143 against turning without interfering with its movements of adjustment, said stop 143 may be slidably mounted on stationary guide rods 148 spaced apart in parallel relation and carried by the bearings 147 as shown in Fig. 11; in addition, the stop 143 may be forked as indicated at 143a for slidable engagement with the rack 36 as illustrated in Fig. 13. For rotating the adjusting rod 145 to shift the stop 143 lengthwise thereof to different positions for arresting the movement of the piston 41 and its associated elements to thereby vary the extent of the feed movements of the upper run a of the belt 23, the one trunnion 146 is provided with a worm gear 149 arranged in mesh with a worm pinion 150. The latter is fixed upon the shaft 151 of a conventional reversible electric motor 152 suitably mounted in the machine and provided with an automatic brake of any conventional type adapted to prevent over-run of said motor; the stop 143 is thus capable of being accurately set to any given position within its range of adjustment to accurately determine, in co-operation with the collar 39, the location of successive cuts. The motor 152 is controlled in any convenient manner as by means of a suitable switch 183 located on the machine so as to be readily accessible to the operator. In installations in which the stop 143 is hidden from the view of the operator as in the illustrated example, and in any case to visibly indicate the distance between successive cuts and the resulting width of the cut sections of fabric or other material for which the mechanism is set, the machine is preferably provided with an indicating means co-operating with said stop 143.

In the form shown in the drawings this indicating means comprises a bar 153 carried by and movable with the stop 143 and terminating in the form of a visible indicator 154 which projects over a segmental plate 155 mounted on the frame 20 so as to lie over the upper run a of the belt 23 without interference with the feeding movements thereof; in the preferred form the indicator 154 is provided with a transparent section 154a of celluloid or the like. A scale member 156 having a suitable scale 157 produced thereon is located beneath and in co-operating relation to the indicator 154 as shown in Figs. 1 and 12; in order that the scale 157 in cooperation with the indicator 154 may correctly indicate the width of the cut sections of fabric or other material regardless of the position to which the raceway 91 and its associated elements are set, the scale member 156 is arranged to move with said raceway 91 in predetermined inverse relation thereto. In the illustrated example the scale member 156 is accordingly carried by a vertical pivot member 158 extending through and journalled in a bearing 159 fixed upon the frame 20 as shown in Fig. 13; at its lower end the pivot member 158 is provided with an arm 160 extending radially outward therefrom and connected by means of a link 161 with a corresponding arm 162 projecting outwardly from the thrust collar 122 as illustrated in Fig. 4. With this arrangement the scale member 156 will occupy the position shown in Figs. 1 and 12 when the raceway 91 and its associated elements occupy an angular position of for instance 45° as illustrated in Fig. 1; as the raceway 91 is shifted toward a position in which it extends at right angles to the upper run a of the belt 23 or to the direction of feed thereof, said scale member 156 will be shifted coincidentally and finally will occupy the inclined position indicated by dotted lines in Fig. 12 when the raceway 91 extends transversely across the belt 23 at right angles to the feeding direction of the upper run a. From the diagram shown in Fig. 15 it will be obvious that the movement of the stop 143 when the raceway 91 occupies the angular position shown in Fig. 1 must be somewhat greater in range in order to provide a given distance between successive cuts for cut sections of predetermined width, than is necessary to provide cut sections of the same width when the raceway 91 is set at a right angle to the feeding direction of the upper run a of the belt 23; the same rule holds true to varying degrees when the raceway 91 occupies positions between the one illustrated in Fig. 1 and one in which it extends at right angles across said upper run a. This is due to the fact that the movements of the stop 143 are in directions parallel to the direction of feed of the upper run a of said belt 23; by shifting the scale plate 156 in inverse relation to the raceway 91 the scale 157 will always properly co-operate with the indicator 154 to secure the desired cutting results in an accurate and reliable manner.

The cut sections of fabric or other material may be disposed of in any convenient manner, for instance by being transferred to a take-off conveyor in the form of an endless belt 163 located in receiving relation to the delivery end of the upper run a of the belt 23, as shown in Figs. 1 and 2. The conveyor belt 163 is mounted on rollers 164 journalled on an auxiliary frame 165 and may be driven in any suitable manner, as by means of a belt 166 and pulleys 167 mounted to rotate with the adjacent rollers 22 and 164 respectively. To efficiently separate the cut sections from each other as said sections are transferred to the take-off conveyor belt 163, a suitable means is provided adjacent to the delivery end of the upper run a of the belt 23. In the illustrated example this means comprises a rotatable member shown in the form of a rotary brush 168 journalled in stationary bearings 169 in tangent surface engagement with the upper run of the conveyor belt 163 as illustrated in Figs. 1 and 2; in the example shown in the drawings this brush 168 is driven by means of a crossed belt 170 and pulleys 171 fixed upon the shaft 21 of the one roller 22 and on the shaft of the brush 168 respectively. The arrangement is such that the brush 168 is rotated at a speed in excess of the speed of travel of the conveyor belt 163, which itself preferably travels at a somewhat greater speed than the upper run a of the belt 23; as a result each cut section will pass from the upper run a of the belt 23 to the take-up conveyor belt 163 and beneath the brush 168 and by the action of the latter, in combination with the relatively greater speed of the take-off belt 163 will be pulled away and definitely separated from the next succeeding cut section of fabric or other material. The cut sections are thereby prevented from sticking together which is of particular importance when the novel machine is operating to cut impregnated fabrics or other materials which because of their inherent tackiness tend to adhere to each other.

In describing the operation of the machine it will be assumed that it is being used for cutting a web of impregnated fabric of the type which is commonly used in the manufacture of shoes or casings for pneumatic tires; it is of course to be understood that, while the machine is particularly designed for cutting such impregnated fabrics, it is equally well adapted to efficiently cut other fabrics and materials both tacky and non-tacky and the description is accordingly not intended to define the limits of utility of said machine. For descriptive purposes it will further be assumed that the web of fabric is to be cut on the bias at an angle of approximately 45° in which case the raceway 91 and its associated elements are adjusted to the position shown in Fig. 1; the bias angle of the cuts may obviously be changed by properly adjusting the raceway 91, which, as previously stated, may also be set to cut the fabric or other material transversely at right angles to its feeding movement. The setting of the raceway 91 to an angle of approximately 45° automatically adjusts the scale member 156 to the position shown in Figs. 1 and 12 so that, by means of the indicator 154 or more particularly its celluloid or other section 154a, in combination with the scale 157, the stop 143 may be adjusted to space the successive cuts apart a distance corresponding to the width of the sections it is desired to cut. To effect the predetermined setting of the stop 143, the switch 183 is thrown to close the electric circuit in which the motor 152 is located so that the latter is caused to operate in the direction to bring about the desired results; the motor 152 by operation of the worm pinion 158 and worm gear 149 will rotate the threaded shaft 145 and accordingly will cause the stop 143 to travel lengthwise of said shaft 145 by the action of the co-operating screwthreads. This movement of the stop 143 will carry with it the bar 153 and the indicator 154 which by moving lengthwise of the scale 157 will indicate the setting of the stop 143; as soon as the indicator 154 reaches the proper point on the scale 157, the switch 183 is thrown to open the aforesaid circuit and thus cut out the motor 152 which, because of the automatic brake forming part thereof, stops immediately and does not over-run. The stop 143 is therefore set accurately and reliably at a point which will produce the predetermined spacing between successive cuts and as a result, the desired width in the cut sections; subsequent adjustments of the stop 143 to vary the distance between cuts and the resulting width of the cut sections may be made by suitably operating the switch 183 in the interval between cuts, without requiring the machine to be shut down to effect such changes.

Everything being in readiness the motor 90 is started by manipulation of a suitable controlling switch and the web A of impregnated fabric to be cut is either placed upon the upper run a of the belt 23 or fed thereto from a suitable source of supply in any convenient manner. On the assumption that the parts are in the position illustrated in Fig. 3, or in other words at the beginning of a feeding step whereby the upper run a of the belt 23 will be advanced in the direction of the arrow b in Fig. 1, the valve plunger 64 of the valve 48 will occupy a position to the right of that shown in Fig. 14 so that the pipe 46 will be in communication with the annular space 67 and accordingly with the inlet pipe 52; at the same time the pipe 47 will be in connection with the space behind the plunger 64 and therefore with the outlet pipe 63.

As a result oil or other substantially non-compressible fluid will be pumped by the pump 53 operated by the electric motor 53a which previously has been started, and will pass through the pipe 52, annular space 67 and pipe 46 to the right hand end of the cylinder 42 in Fig. 3, which corresponds to the left hand end of said cylinder in Fig. 10. This oil or its equivalent is effective upon the piston 41 and causes the latter to move toward the right in Fig. 10 which would be toward the left in Fig. 3; the piston rod 40 and rack 36 are correspondingly moved, the latter causing the gear 35, the shaft 34 and the bevel-pinion 32 to be rotated, it being understood that the ratchet unit 33 is effective to develop a driving action in this direction. The rotary motion is transmitted by the bevel-pinion 31 to the shaft 26 and accordingly rotates the bevel-pinions 28 whereby rotative movements are coincidentally transmitted to the bevel pinions 29 and to the shafts 21 and the rollers 22 carried thereby; as a result of these operations the upper run $a$ of the belt 23 is advanced in the direction of the arrow $b$ in Fig. 1 and carries the web A to be cut along with it beneath the raceway 91. During the indicated operation of the piston 41 and its associated elements, the oil or its equivalent which is located in the cylinder 42 in advance of said piston 41 will be forced from said cylinder 42 through the pipe 47, the space behind the valve plunger 64, and outlet pipe 63 back to the tank 55. The described feeding of the upper run $a$ of the belt 23 continues until the collar 39 through its cushion 39ª engages the stop 143 which accordingly prevents any further movement of the piston 41 and the parts connected therewith in the feeding direction; if the operation of the piston 41 is arrested at a point in advance of its limit in a feeding direction, the oil or its equivalent which continues to be pumped by the pump 53 will be by-passed through the relief valve 56 and pipe 57 back to the tank 55.

Coincidentally with the above operations the crank-gear 85 and connecting rod 82 will shift the cross-head 80 lengthwise of the guideway 81 and will correspondingly actuate the rack 78 whereby the gear 126 and thrust-collar 122 will be rotated to concurrently rotate the cable-wheel 127; as a result the cable 128 will be operated in a manner to draw the carriage 92 lengthwise of the raceway 91 in a direction to cause the knife 95 to develop an inoperative movement of recovery. During such movement the crank-gear 85 rotates the shaft 86 and cam 114 which, by acting on the cross-member 112 forces the plungers 110 in the cylinders 109 toward the left in Figs. 3 and 6; the oil or its equivalent in said cylinder 109 is thereby forced through the pipes 107 and becomes effective upon the plungers 105 in the cylinders 106 to raise said plungers 105 and raceway 91 against the tension of the springs 104. The knife 95 is thus in an inoperative position throughout the aforesaid movement of recovery, it being understood that the cam 114 is of such shape and dimensions as to effect this result. The described elevation of the raceway 91 at the same time raises the pressure members 98 so that the web of material A is free to pass between said members 98 and the cutting bar 139 over which said web A travels as shown in Fig. 9.

As the rack 78 is operated in the described manner to actuate the gear 126 and cable-wheel 127, the operating member 75 will be correspondingly moved and will travel lengthwise of the valve rod 70 until it engages the stop-collar 76 thereon; at this stage the operating member 75 by exerting a pushing action on the stop-collar 76 will shift the valve plunger 64 toward the left in Figs. 3 and 14 to a position in which the pipe 47 is in communication with the annular space 67 and accordingly with the inlet pipe 52. At the same time the pipe 46 is connected with the space to the right of the valve plunger 64 in Fig. 14 and through the medium of the apertures 69 and the interior of the valve plunger 64 is brought into communication with the outlet pipe 63. In this adjustment of the valve plunger 64 the oil from the pump 53 passes from the pipe 52 to the annular space 67 and then through the pipe 47 to the right hand end of the cylinder 42 in Fig. 10 which is the left hand end of said cylinder in Fig. 3. The pressure oil or its equivalent at this state therefore forces the piston 41 toward the left in Fig. 10 which would be to the right in Fig. 3 and correspondingly moves the piston rod 40 and rack 36 until the collar 39 engages the impact receiving member 44 of the shock absorber shown in Fig. 10; during any interval which may develop before reversal again takes place, the oil or its equivalent being pumped by the pump 53 will be by-passed through the relief valve 56 and pipe 57 back to the tank 55. As the rack 36 is operated in the return direction, the gear 35 and shaft 34 will be correspondingly actuated, and will cause the ratchet unit 33 to develop a movement of recovery independently of the bevel-pinions 32 and 31 with the result that the shaft 26 remains stationary and no movement of the upper run $a$ of the belt 23 takes place; during this period of rest the knife 95 is operated to cut the web A in the following manner:

In proper timing sequence with the aforesaid operations, the cam 114 permits the plungers 110 to move toward the right in Figs. 3 and 6 so that the oil pressure on the plungers 105 tending to maintain the same in a raised position is relieved whereupon the springs 104 assisted by gravity cause the raceway 91 to drop and the pressure members 98 to engage the web A and clamp it against movement on the cutting bar 139; this downward movement of the raceway 91 also adjusts the knife 95 to its cutting position.

By this time the crank-gear 85 will exert a pull on the connecting rod 82 and cross-head 80 whereby the latter and rack 78 with it will be moved toward the right back to the position illustrated in Fig. 3. The gear 126, thrust collar 122, and cable wheel 127 will thereby be rotated in a return direction and will develop a pull on the cable 128 whereby the carriage 92 will be drawn lengthwise of the raceway 91 and the knife 95 will be propelled in a direction to transversely cut the web A on the bias in accordance with the angular adjustment of the raceway 91 relatively to the upper run $a$ of the belt 23; during this cutting movement of the knife 95 the cutting edge 95ª will not only cut the web A but at the same time will wedge the material apart as the cut proceeds to facilitate the cutting operation. The actual cut of the web A is made with the cutting edge 95ª, in registry with the groove 139ª of the cutting bar 139 which protects the upper run $a$ of the belt 23 against injury by the knife 95.

At the completion of the particular cut the raceway 91 and its associated elements are again lifted to raise the knife 95 to an inoperative position, said knife 95 being slidably moved in a movement of recovery lengthwise of the raceway 91 in such inoperative position, and the upper run $a$ of the belt 23 is fed another step to advance the web A for the next succeeding cut. These operations are repeated in mechanical sequence throughout any given period of operation of the machine, the feed of the web A taking place while the knife 95 is describing a movement of recovery and the actual cutting of the web A taking place while the belt 23 is at rest in the interim between successive feeding steps.

As the web A is cut into sections in the manner set forth the cut sections will be carried along by the belt 23 with each feeding step thereof, and will be successively transferred to the take-off conveyor belt 163; as the sections pass beneath the brush 168, the latter will cause said sections to become successively separated in the manner previously set forth herein. The cut sections are thereby prevented from adhering to each other which is of particular advantage in case the material is of a tacky nature. The separated cut sections may simply be removed manually from said take-off conveyor or be disposed of thereby in some other convenient and suitable manner.

If the angle or direction of the cuts with respect to the feeding direction of the web A is to be changed, this may readily be accomplished by first loosening the nuts 136 and then adjusting the supporting bar 101 and with it the raceway 91 until the desired setting has been secured; the nuts 136 are then screwed home to fix the parts in such adjustment. As previously stated the scale member 156 will partake of the shifting of the raceway 91 to different settings in inverse relation thereto so that, by suitably manipulating the switch 183, the stop 143 may be accurately adjusted to effect the cutting of the web A in a manner to provide cut sections of any desired width within the range of the machine.

If for any reason it becomes necessary to by-pass the oil or its equivalent to prevent it from reaching the valve 48 and acting on the piston 41, this may readily be accomplished by depressing the pedal 62 to operate the linkage 61 and operating arm 60 in a manner to connect the pipe 59 with the pipe 52 and consequently the output side of the pump 53; the oil or its equivalent is then by-passed through the pipe 59 back to the tank 55 or other source of supply.

The machine is extremely simple in construction and efficient in operation and because of the hydraulic operating mechanism is absolutely reliable and at the same time requires no particularly skilled supervision in its operation. While the machine is designed primarily for cutting impregnated fabrics or other materials having an inherent tackiness, it may be utilized for cutting other fabrics and materials with equal efficiency.

Various changes in the specific forms shown and described may be made within the scope of the claims without departing from the spirit of the invention.

We claim:

1. In a cutting machine of the kind described including an endless belt having its upper run movable in a horizontal direction, a vertically movable raceway extending transversely across said upper run, feeding mechanism for feeding said upper run of said belt in successive steps, cutting means adapted to be reciprocated in said raceway, and operating means for reciprocating said cutting means in said raceway, that improvement which comprises, a cylinder, a piston reciprocable in said cylinder for operating said feeding mechanism, a pump for supplying a hydraulic operating medium to said cylinder, a control valve for directing said hydraulic operating medium alternately to opposite ends of said cylinder, hydraulic elevating means for raising said raceway and for effecting a lowering thereof during the reciprocation of said cutting means therein whereby said cutting means is adjusted alternately to inoperative and operative positions, a crank-member for operating said operating means whereby said cutting means is reciprocated in said raceway, means operated by said crank-member for adjusting said control valve, a cam connected with said crank-member for actuating said hydraulic elevating means, and an electric motor operatively connected with said crank-member.

2. In a cutting machine of the kind described including an endless belt having its upper run movable in a horizontal direction, a vertically movable raceway extending transversely across said upper run, mechanism for feeding the upper run of said belt in successive steps, cutting means adapted to be reciprocated in said raceway, and operating means for reciprocating said cutting means in said raceway, that improvement which comprises hydraulic operating means for operating said feeding mechanism, a control valve for controlling said hydraulic operating means, hydraulic elevating means for raising said raceway and for effecting a lowering thereof during the reciprocating movements of said cutting means whereby the latter is adjusted alternately to inoperative and operative positions, actuating means for actuating the operating means whereby said cutting means is reciprocated, for operating said hydraulic elevating means, and for adjusting said control valve, and an electric motor for operating said actuating means.

3. In a cutting machine of the kind described including an endless belt having its upper run movable in a horizontal direction, a vertically movable raceway extending transversely across said upper run, feeding mechanism for feeding said upper run of said belt in successive steps, cutting means adapted to be reciprocated in said raceway, and operating means for reciprocating said cutting means in said raceway, that improvement which comprises, a cylinder, a piston reciprocable in said cylinder for operating said feeding mechanism, a pump for supplying a hydraulic operating medium to said cylinder, a control valve for directing said hydraulic operating medium alternately to opposite ends of said cylinder, a stop co-operating with said piston to arrest its movement in one direction for determining the space between successive cuts, a rotatable screwthreaded rod in threaded connection with said stop for adjusting the position of said stop, and manually controlled means for rotating said rod, an indicator movable with said stop, and a scale member having a scale thereon adapted to co-operate with said indicator to indicate the setting of said stop.

4. In a cutting machine of the kind described including an endless belt having its upper run movable in a horizontal direction, a vertically movable raceway extending transversely across said upper run, and adjustable relatively thereto in a horizontal plane to different angular positions, mechanism for feeding the upper run of said belt in successive steps, cutting means adapted to be reciprocated in said raceway, and operating means for reciprocating said cutting means in said raceway, that improvement which comprises hydraulic operating means for operating said feeding means, adjustable means for selectively determining the space between successive cuts, an indicator movable with said adjustable means, a pivoted scale member having a scale thereon adapted to co-operate with said indicator to indicate the setting of said adjustable means, and a connection between said raceway and scale member whereby the latter is pivotally adjusted in inverse relation to said raceway coincidentally with the adjustment thereof to different angular positions.

5. In a cutting machine of the kind described including an endless belt having its upper run movable in a horizontal direction, a vertically movable raceway extending transversely across said upper run, and adjustable relatively thereto in a horizontal plane to different angular positions, mechanism for feeding the upper run of said belt in successive steps, cutting means adapted to be reciprocated in said raceway, and operating means for reciprocating said cutting means in said raceway, that improvement which comprises hydraulic operating means for operating said feeding means, adjustable means for selectively determining the space between successive cuts, an indicator movable with said adjustable means, a movable scale member provided with a scale adapted to co-operate with said indicator to indicate the setting of said adjustable means, and a connection between said raceway and scale member whereby the latter is adjusted to different co-operating positions coincidentally with the adjustment of the raceway to different angular positions.

6. In a cutting machine of the kind decribed including an endless belt having its upper run movable in a horizontal direction, a vertically movable raceway extending transversely across said upper run, feeding mechanism for feeding said upper run of said belt in successive steps, cutting means adapted to be reciprocated in said raceway, and operating means for reciprocating said cutting means in said raceway, that improvement which comprises hydraulic operating means for operating said feeding means, adjustable means for selectively determining the space between successive cuts, a pump for supplying a hydraulic operating medium to said hydraulic operating means, and a by-pass for automatically by-passing said operating medium in dependence upon the setting of said adjustable means.

7. In a cutting machine of the kind described including an endless belt having its upper run movable in a horizontal direction, a vertically movable raceway extending transversely across said upper run, feeding mechanism for feeding said upper run of said belt in successive steps, cutting means adapted to be reciprocated in said raceway, and operating means for reciprocating said cutting means in said raceway, that improvement which comprises, a cylinder, a piston reciprocable in said cylinder, a piston rod movable with said piston and projecting exteriorly of said cylinder, means connected with said piston rod for operating said feeding mechanism, a collar movable with said piston rod, an internally threaded stop located in the path of said collar for arresting the movement of said piston in one direction for determining the space between successive cuts, a rotatable screwthreaded rod in threaded connection with said stop for adjusting the position thereof, a manually controlled electric motor for rotating said rod, and a yielding shock absorber co-operating with said collar for arresting the movement of said piston in the opposite direction.

8. In a cutting machine of the kind described including an endless belt having its upper run movable in a horizontal direction, a vertically movable raceway extending transversely across said upper run, feeding mechanism for feeding said upper run of said belt in successive steps, cutting means adapted to be reciprocated in said raceway, and operating means for reciprocating said cutting means in said raceway, that improvement which comprises hydraulic operating means for operating said feeding mechanism, a control valve for controlling said hydraulic operating means, a valve stem connected with said control valve, spaced stops on said valve stem, an operating member slidably mounted on said valve stem between said stops, and means for operating said operating means whereby said cutting means is reciprocated and for shifting said operating member into engagement alternately with said stops to actuate said valve stem and control valve whereby said feeding mechanism is automatically operated in predetermined relation to the operating means for reciprocating said cutting means.

9. In a cutting machine of the kind described including an endless belt having its upper run movable in a horizontal direction, a vertically movable raceway extending transversely across said upper run, feeding mechanism for feeding said upper run of said belt in successive steps, cutting means adapted to be reciprocated in said raceway, and operating means for reciprocating said cutting means in said raceway, that improvement which comprises stationary hydraulic cylinders, raceway plungers movable in said cylinders and connected with said raceway for raising and lowering the same to adjust said cutting means to inoperative and operative positions in alternate sequence during its reciprocation in said raceway, stationary co-operating cylinders connected with said hydraulic cylinders, co-operating plungers in said co-operating cylinders, and means for actuating said co-operating plungers to operate said raceway plungers whereby said raceway is raised and lowered in predetermined synchronism with said feeding mechanism and said means for reciprocating said cutting means.

10. In a cutting machine of the kind described including an endless belt having its upper run movable in a horizontal direction, a vertically movable raceway extending transversely across said upper run, feeding mechanism for feeding said upper run of said belt in successive steps, cutting means adapted to be reciprocated in said raceway, and operating means for reciprocating said cutting means in said raceway, that improvement which comprises stationary hydraulic cylinders, raceway plungers movable in said cylinders and connected with said raceway for raising and lowering the same to adjust said cutting means to inoperative and operative positions in alternate sequence during its reciprocation in said raceway, a pair of spaced co-operating cylinders connected with said hydraulic cylinders, co-operating connected plungers movable in unison in said co-operating cylinders, and a cam operatively connected with said means for reciprocating said cutting means for actuating said co-operating plungers to operate said raceway plungers whereby said raceway is raised and lowered in predetermined synchronism with said feeding mechanism and said means for reciprocating said cutting means.

11. In a cutting machine of the kind described including feeding means for feeding the material to be cut, feeding mechanism for advancing said feeding means in successive steps, and a raceway extending transversely across said feeding means, that improvement which comprises a carriage adapted to be reciprocated in said raceway and consisting of two co-operating sections, springs whereby said sections are forced apart into engagement with said raceway, means for maintaining said sections in co-operative relation to each other without interference with the action of said springs, and a cutting knife mounted on said carriage and extending transversely to the plane of movement thereof.

12. In a cutting machine of the kind described including feeding means for feeding the material to be cut, feeding mechanism for advancing said feeding means in successive steps, and a raceway extending transversely across said feeding means, that improvement which comprises a carriage adapted to be reciprocated in said raceway and consisting of two co-operating sections, springs whereby said sections are forced apart into engagement with said raceway, one of said carriage sections being provided with recesses, pins on the other carriage section projecting into said recesses for maintaining said sections in co-operative relation to each other without interference with the action of said springs, and a cutting knife mounted on said carriage at an inclination to the direction of cut.

13. In a cutting machine of the kind described including an endless belt having its upper run movable in a horizontal direction, a vertically movable raceway extending transversely across said upper run, feeding mechanism for feeding said upper run of said belt in successive steps, cutting means adapted to be reciprocated in said raceway, and operating means for reciprocating said cutting means in said raceway, that improvement which comprises a cutting bar carried by said raceway and extending transversely across the upper run of said belt, said cutting bar having a groove extending lengthwise thereof in registry with the path of travel of said cutting means, and pressure members depending from said raceway and movable therewith in vertical directions, said pressure members co-operating with said cutting bar to clamp the material being cut against movement during the cutting operations.

14. In a cutting machine of the kind described including an endless belt having its upper run movable in a horizontal direction, a vertically movable raceway extending transversely across said upper run, feeding mechanism for feeding said upper run of said belt in successive steps, a carriage adapted to be reciprocated in said raceway, and operating means for reciprocating said carriage in said raceway, that improvement which comprises a cutting knife mounted on said carriage and having a cutting edge and being wedge-shaped at said cutting edge in the cutting direction.

15. In a cutting machine of the kind described including an endless belt having its upper run movable in a horizontal direction, and feeding means for feeding said upper run of said belt in successive steps, that improvement which comprises an upright pedestal, a raceway extending transversely across said upper run of said belt, a supporting bar carrying said raceway, a tubular sleeve carrying said supporting bar and rotatable in said pedestal whereby said raceway is adjustable to different angular positions, a thrust collar rotatably mounted on said sleeve, a ball-bearing between the thrust collar and the pedestal, a second ball-bearing between the thrust collar and said supporting bar, cutting means adapted to be reciprocated in said raceway, a cable wheel fixed upon said thrust collar to rotate therewith, a cable connected with said cable wheel and said cutting means for reciprocating the latter in said raceway, and means operatively connected with said thrust collar for rotating the same on said sleeve.

16. In a cutting machine of the kind described including an endless belt having its upper run movable in a horizontal direction, and feeding means for feeding said upper run of said belt in successive steps, that improvement which comprises an upright pedestal, a raceway extending transversely across said upper run of said belt, means whereby said raceway is rotatably mounted on said pedestal for adjustment in a horizontal plane to different angular positions, cutting means adapted to be reciprocated in said raceway, a cable wheel mounted on said raceway supporting means and rotatable relatively thereto, a cable connected with said cable wheel and said cutting means, and means for operating said cable wheel and cable whereby said cutting means is reciprocated in said raceway.

17. In a cutting machine of the kind described including an endless belt having its upper run movable in a horizontal direction, a raceway extending transversely across said upper run and adjustable relatively thereto in a horizontal plane to different angular positions, and cutting means adapted to be reciprocated in said raceway, that improvement which comprises feeding mechanism for advancing said upper run of said belt in successive steps, setting means adjustable in the direction of feed and co-operating with said feeding mechanism for varying the feeding advance of said upper run, an indicator movable in the direction of feed with said setting means, a pivotally movable scale member provided with a scale co-operating with said indicator to indicate the setting of said setting means, and a connection between said raceway and scale member whereby the latter is pivotally movable coincidentally with said raceway in predetermined relation thereto.

18. In a machine for cutting a web of material into sections including means for advancing the material in successive steps, and cutting means for cutting said material successively at spaced intervals, that improvement which comprises a take-off means located in receiving relation to said advancing means, and means for separating successive cut sections of material from each other as said sections pass to the take-off means.

19. In a machine for cutting a web of material into sections including means for advancing the material in successive steps, and cutting means for cutting said web transversely at successively spaced intervals, that improvement which comprises an independent stop co-operating with said advancing means to arrest operative movements thereof for predetermining the distance between successive cuts, electrically operated means for adjusting said stop to vary the distance between successive cuts to thereby selectively vary the width of the cut sections, and a manually operated switch for controlling said electrically operated means.

20. In a machine for cutting a web of material into sections including means for advancing the material in successive steps, and cutting means for cutting said web transversely at successively spaced intervals, that improvement which comprises a collar reciprocated by said advancing means, a stop projecting into the path of said collar and co-operating therewith to arrest operative movements of said advancing means for predetermining the distance between successive cuts, a rotatable screwthreaded rod carrying said stop and in threaded engagement therewith, and selectively controlled means for rotating said rod relatively to said stop whereby the latter is set to different positions to vary the distance between successive cuts.

21. In a machine for cutting a web of material into sections including means for advancing the material in successive steps, and cutting means for cutting said web transversely at successively spaced intervals, that improvement which comprises a collar reciprocated by said advancing means, a stop projecting into the path of said collar and co-operating therewith to arrest operative movements of said advancing means for predetermining the distance between successive cuts, a rotatable screwthreaded rod carrying said stop and in threaded engagement therewith, an electric motor, gearing operatively connecting said motor with said rod for rotating the same relatively to said stop whereby the latter is set to different positions to vary the distance between successive cuts, and a switch for controlling the operation of said motor.

22. In a machine for cutting a web of material into sections including movable means for supporting said web of material, that improvement which comprises hydraulically operated mechanism for operating said movable means intermittently to advance said web of material in successive steps, and means co-operating with said hydraulically operated means to control the web-advancing operations thereof in precise accordance with the predetermined length of the successive steps to thereby precisely define the predetermined distance between successive cuts.

ODD WENNBERG.
ALFRED E. WEGNER.
CHARLES C. SPADONE.